(12) United States Patent
Kaneko (10) Patent No.: US 7,457,131 B2
(45) Date of Patent: Nov. 25, 2008

(54) FLAT DISPLAY DRIVING APPARATUS

(75) Inventor: Takayuki Kaneko, Higashiosaka (JP)

(73) Assignee: Simotec Inc., Osaka-Hu (JP)

( * ) Notice: Subject to any disclaimer, the term of this patent is extended or adjusted under 35 U.S.C. 154(b) by 54 days.

(21) Appl. No.: 11/730,237

(22) Filed: Mar. 30, 2007

(65) Prior Publication Data

US 2007/0247977 A1  Oct. 25, 2007

(30) Foreign Application Priority Data

Mar. 30, 2006 (JP) .............................. 2006-094417

(51) Int. Cl.
    *H05K 5/00* (2006.01)
(52) U.S. Cl. ....................................... 361/755; 361/810
(58) Field of Classification Search ................. 361/755, 361/810, 807, 825; 74/469, 473
    See application file for complete search history.

(56) References Cited

U.S. PATENT DOCUMENTS 1,887,647 A * 11/1932 Kochs et al. ................... 297/71
2007/0035164 A1 * 2/2007 North ....................... 297/217.1

* cited by examiner

*Primary Examiner*—Hung S Bui
(74) *Attorney, Agent, or Firm*—Bacon & Thomas, PLLC

(57) ABSTRACT

The driving apparatus including a rotation driving unit in the bottom which has an electric motor for rotation which is provided to a base plate for rotation and a train of gears for reducing rotation speed which reduces the rotation of the motor to rotate a base plate for elevation; a elevation driving unit in the middle which has an electric motor provided to the base plate for elevation and a train of gears which reduces the rotation of the motor as well as moves a base plate for tilting up and down via an elevating means, and; the driving unit on the top which has an electric motor for tilting which is provided to the base plate for tilting and a train of gears for tilting and reducing rotation speed which reduces the rotation speed of the motor and tilts a tilting plate provided to the flat display via a tilting means.

3 Claims, 14 Drawing Sheets

FLAT DISPLAY DRIVING APPARATUS

BACKGROUND OF THE INVENTION

1. Field of the Invention

The present invention relates to a flat display driving apparatus which can drive a flat display such as a liquid crystal display or a plasma display in a rotating manner in horizontal direction, as well as drive up and down in vertical directions while allowing the flat display to tilt backward and forward.

2. Description of the Related Art

As a conventional flat display driving apparatus, there is one by which a display is moved in horizontal directions in a rotating manner by an electric motor while tilting into a tilt direction by the electric motor (for example, refer to the Patent References 1 and 2).

Moreover, there are other examples in which a display is moved in a rotating manner in horizontal directions and also tilted backward and forward by hand (for example, refer to Patent Reference 3) and one in which a display is moved up and down and also tilted backward and forward by hand (for example, refer to Patent Reference 4).

However, none of these conventional apparatuses can perform rotating movement in horizontal directions, vertical up and down movement, and tilting backward and forward. Moreover, there was no apparatus in which all these movements are driven by an electric motor.

[Patent Reference 1] Japanese Published Unexamined Patent Application No. 2004-258055
[Patent Reference 2] Japanese Published Unexamined Patent Application No. 2004-304679
[Patent Reference 3] Japanese Published Unexamined Patent Application No. 2005-208080
[Patent Reference 4] Japanese Published Unexamined Patent Application No. 2005-300922

SUMMARY OF THE INVENTION

The present invention aims at providing a flat display driving apparatus which can move a flat display horizontally in a rotating manner, can move vertically up and down, and at the same time, can tilt backward and forward while these movements are easily and surely enabled by an electric motor.

A flat display driving apparatus of the present invention is a driving apparatus for supporting a flat display at a lower part thereof, moving the flat display horizontally in a rotating manner, moving it up and down vertically, and tilting it backward and forward and includes; a rotation driving unit, a elevation driving unit, and a tilting driving unit which are mounted from the bottom in series, wherein the rotation driving unit in the bottom has an electric motor for rotation which is provided to a base plate for rotation and a train of gears for reducing rotation speed which reduces the rotation of the motor to rotate a base plate for elevation; the elevation driving unit in the middle has an electric motor provided to the base plate for elevation and a train of gears which reduces the rotation of the motor as well as moves a base plate for tilting up and down via an elevating means, and; the tilting driving unit on the top has an electric motor for tilting which is provided to the base plate for tilting and a train of gears for reducing rotation speed for tilting which reduces the rotation speed of the motor and tilts a tilting plate provided to the flat display via a tilting means.

Moreover, the elevating means includes an elevating screw output axis which is an output axis of the train of gears for reducing rotation speed, a slide frame which screws together with the elevating screw output axis and slides to move, and a pantograph type elevating member of which upper end moves up and down along with the movement of the slide frame to move up and down the base plate for tilting which is connected to the upper end.

Furthermore, the tilting means has a screw output axis for tilting which is an output axis of the train of gears for reducing rotation speed for tilting and an elevating chip which screws together with the screw output axis for tilting to move up and down and tilts the base plate for tilting.

The driving apparatus for a flat display of the present invention has an advantage that it enables a flat display to rotate horizontally, to move up and down, and to tilt backward and forward while these movements are more easily and surely performed by an electric motor.

BRIEF DESCRIPTION OF THE DRAWINGS

FIG. 1-1 is an enlarged explanatory diagram of a driving apparatus M of FIG. 1.

FIG. 2-1 is an enlarged explanatory diagram of a driving unit of FIG. 2.

FIG. 2-2 is am enlarged diagram showing a substantial part of a train of gears for reducing speed of a rotation driving unit.

FIG. 2-3 is an explanatory diagram showing attachment of a rotation regulating plate.

FIG. 2-4 is an explanatory diagram showing a condition where a flat display is rotated to right.

FIG. 3-1 is an enlarged explanatory diagram of a driving unit of FIG. 3.

FIG. 3-2 is an explanatory perspective view of a train of gears for reducing speed of elevation.

FIG. 4-1 is an enlarged explanatory diagram of a driving unit of FIG. 4.

FIG. 4-2 is an explanatory perspective view of a train of gears for reducing speed for tilting.

FIG. 4-3 is an explanatory diagram of tilting movement.

FIG. 4-4 is an explanatory diagram of a condition where a flat display is tilted backward.

DESCRIPTION OF THE PREFERRED EMBODIMENTS

Figure 1:
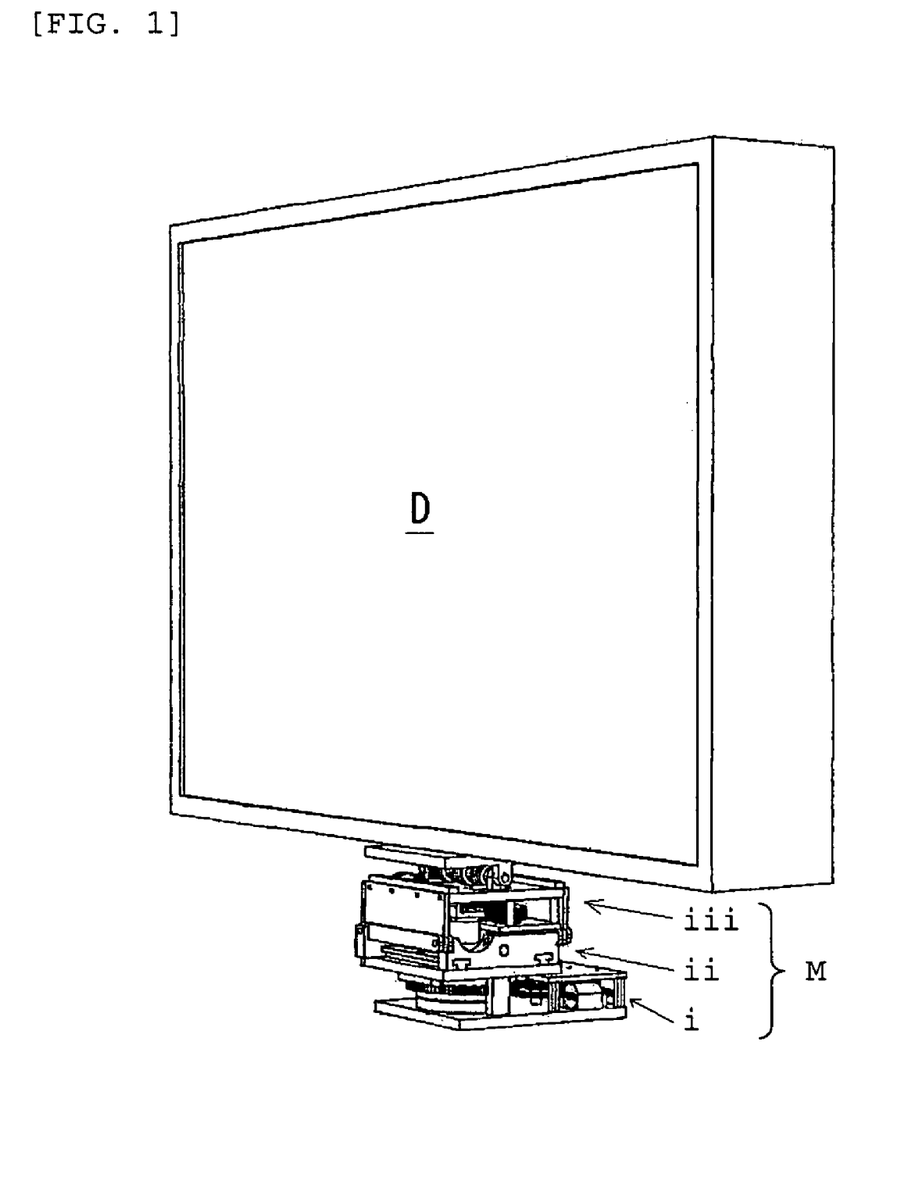
FIG. 1 is a perspective view of the whole body of an embodiment example of an apparatus of the present invention.
Figure 11:
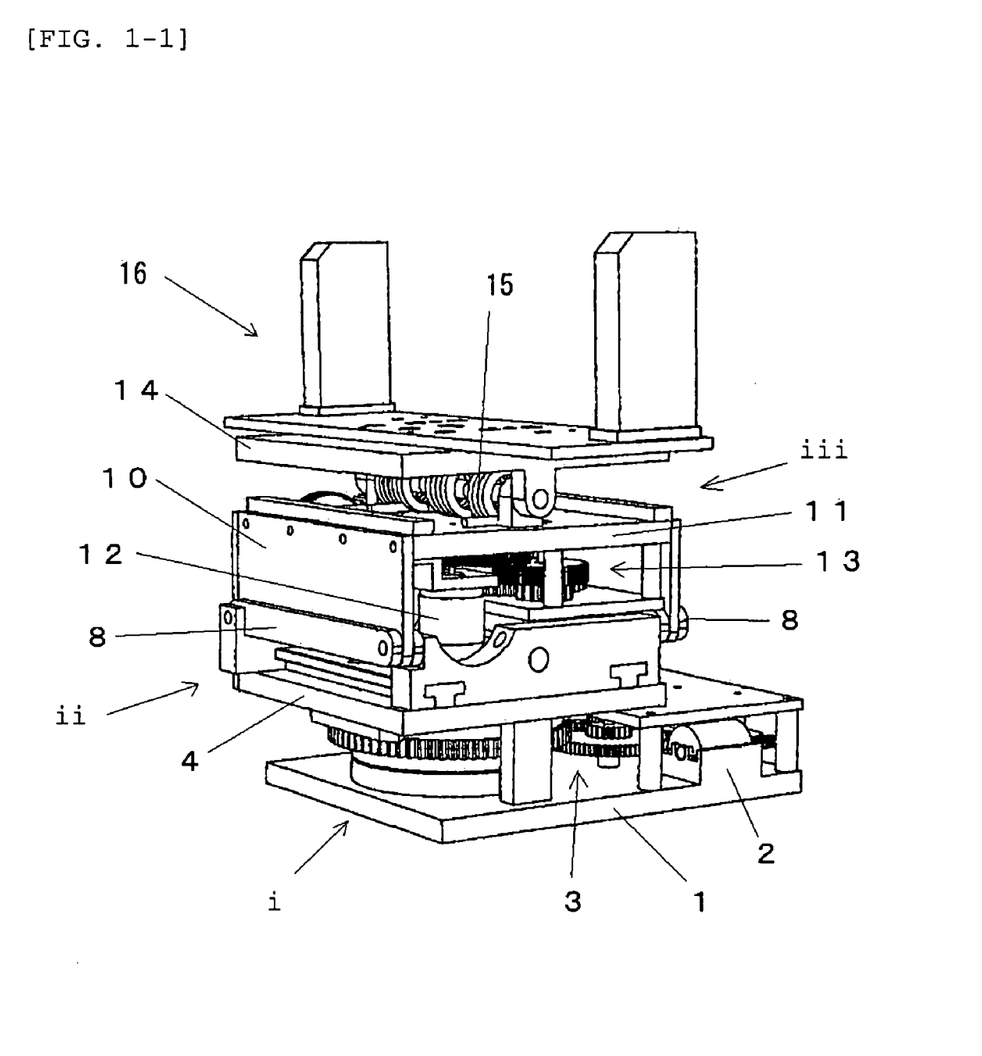

FIG. 1 is a perspective view of the whole body of an embodiment of the apparatus of the present invention where reference numeral D is a flat display such as a liquid crystal display or a plasma display, and reference numeral M is a driving apparatus for rotating the display in horizontal directions, moving up and down vertically, and tilting backward and forward while supporting the display D in the lower part thereof. As apparent from FIG. 1-1, the driving apparatus M includes a rotation driving unit i, an elevation driving unit ii and a tilting driving unit iii. The base part of the driving apparatus M, which is a base plate for rotation 1 of the rotation driving unit i is attached and fixed to any appropriate supporting means (not shown) such as a setting mount or a structural object.

Figure 2:
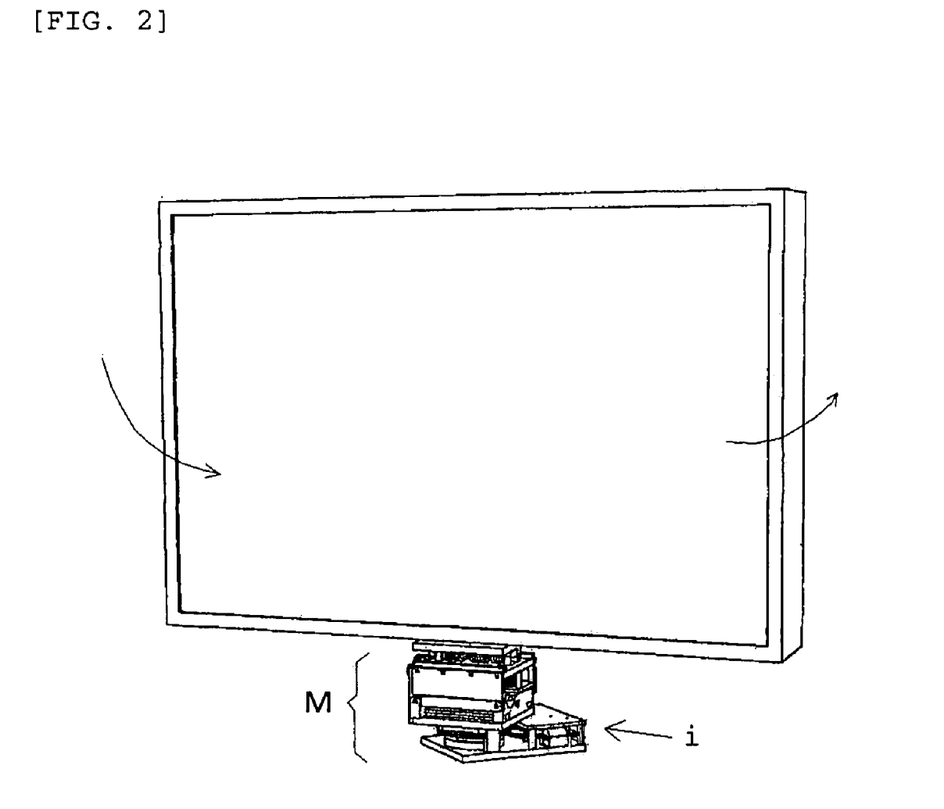
FIG. 2 is an explanatory diagram showing a condition where the flat display that is turned to left.
Figure 21:
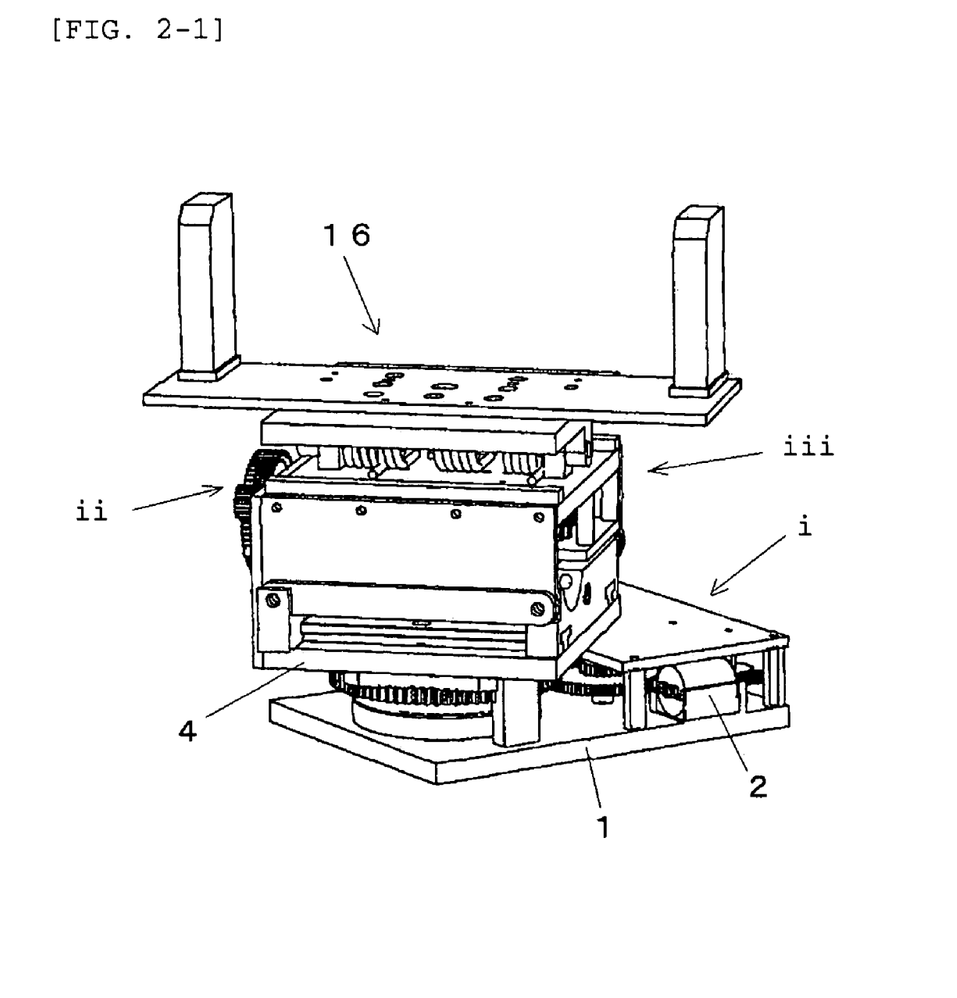

FIG. 2 shows a condition where the flat display D is turned in a rotating manner to left as indicated by an arrow by the rotation driving unit i of the driving apparatus M and FIG. 2-1 is an enlarged perspective view of the driving apparatus M.

Figure 22:
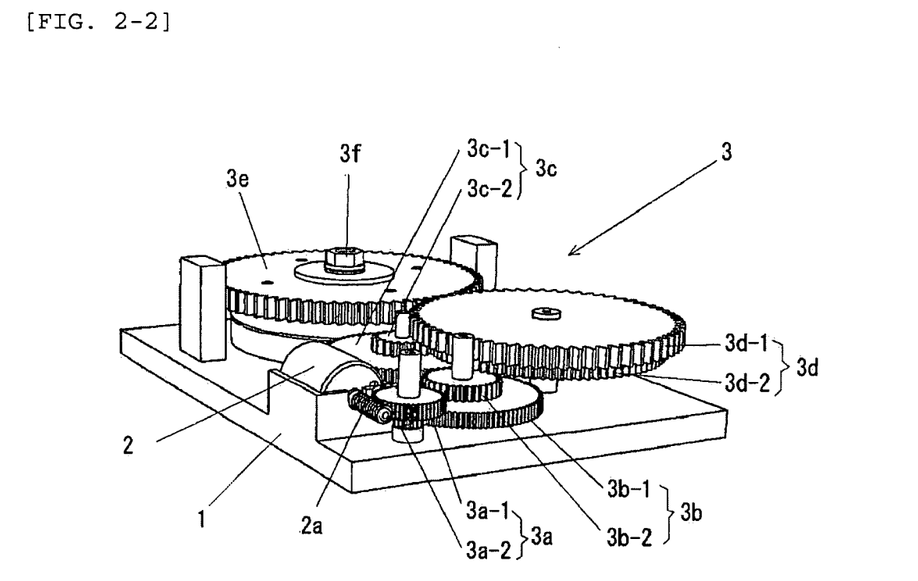

FIG. 2-2 shows a train of gears for reducing speed for the rotation driving unit i in which a large gear 3a-1 of a first gear 3a is engaged with a warm gear 2a which is attached to an output rotation axis of an electric motor for rotation 2 provided on the base plate for rotation 1. A small gear 3a-2 of the first gear 3a is engaged with a large gear 3b-1 of a second gear 3b while a small gear 3b-2 thereof is engaged with a large gear 3c-1 of a third gear 3c. A small gear 3c-2 of the gear 3c is engaged with a small gear 3d-2 of a fourth gear 3d. A large gear 3d-1 of the fourth gear 3d is engaged with a fifth gear 3e. Due to the warm gear 2a and a train of gears for reducing rotation speed 3, rotation of the electric motor for rotation 2 is reduced to a large extent.

Figure 23:
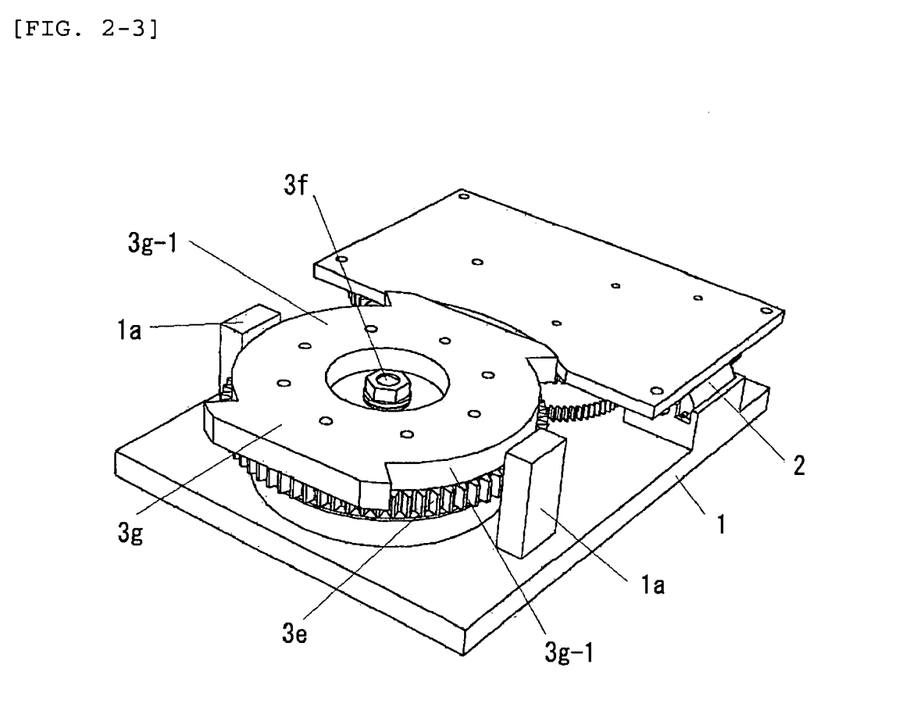

As shown in FIG. 2-3, a rotation regulating plate 3g is attached and fixed to a rotation output axis 3f of the fifth gear 3e. Since the rotation regulating plate 3g is attached to the rotation output axis 3f by an appropriate friction clutch (not shown), when an overload is applied to the rotation regulating plate 3g, the rotation regulating plate 3g is caused to slip, making the fifth gear 3e to spin idly. A notch 3g-1 is formed on the rotation regulating plate 3g along a predetermined angle so that rotation angle can be controlled by a stopper 1a attached to the base plate for rotation 1.

On the rotation regulating plate 3g, a base plate for elevation 4 (refer to FIG. 2-1) is attached so that the base plate for elevation 4 can be rotated in an integrated manner causing the flat display D rotated via the elevation driving unit ii and the tilting driving unit iii.

Figure 24:
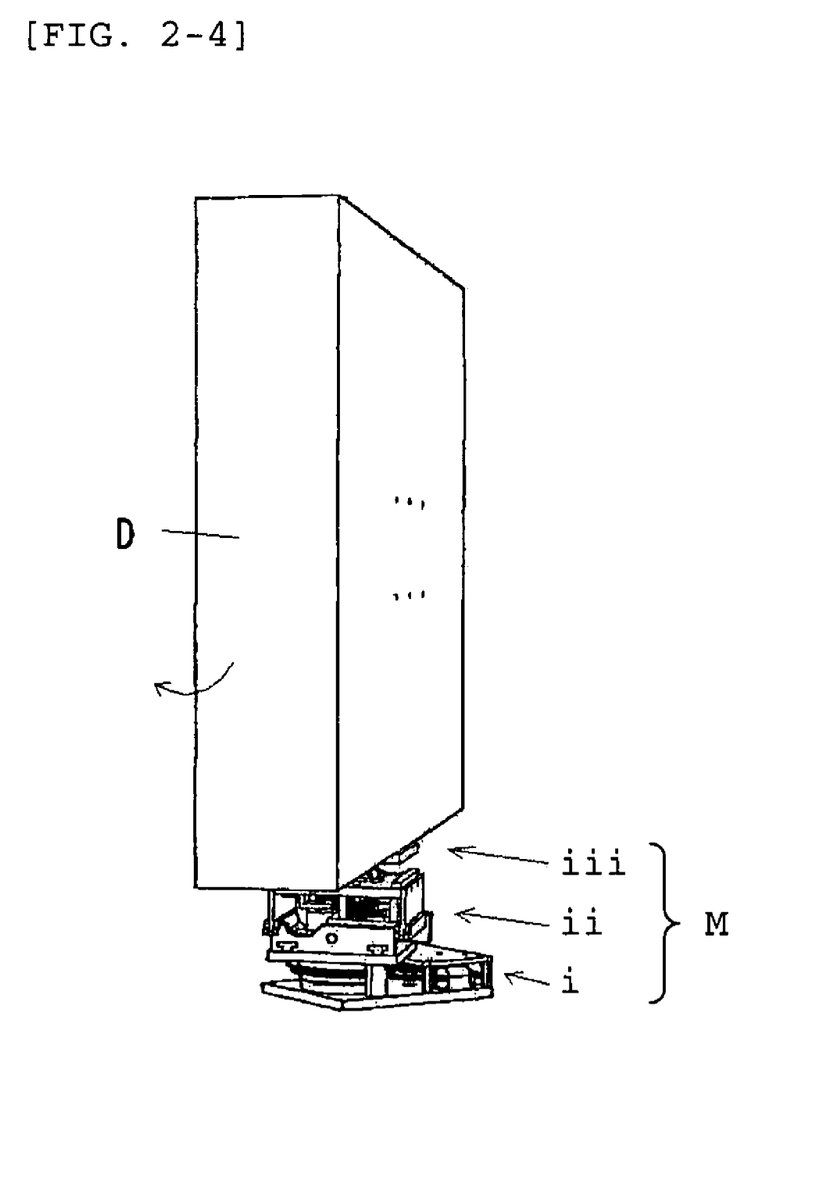

FIG. 2-4 shows a state where the electric motor for rotation 2 is caused to make reverse rotation to turn the flat display D to the opposite side, that is, horizontally to right.

Figure 3:
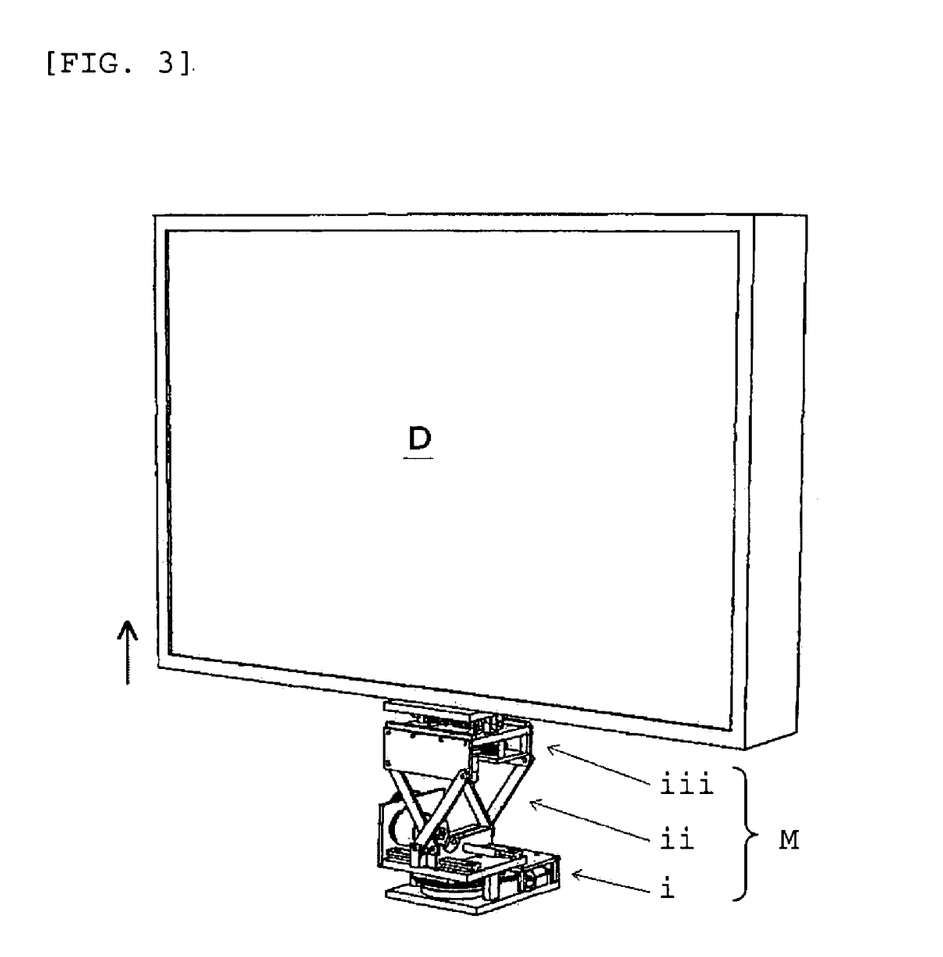
FIG. 3 is an explanatory diagram showing a condition where a flat display is moved upward.
Figure 31:
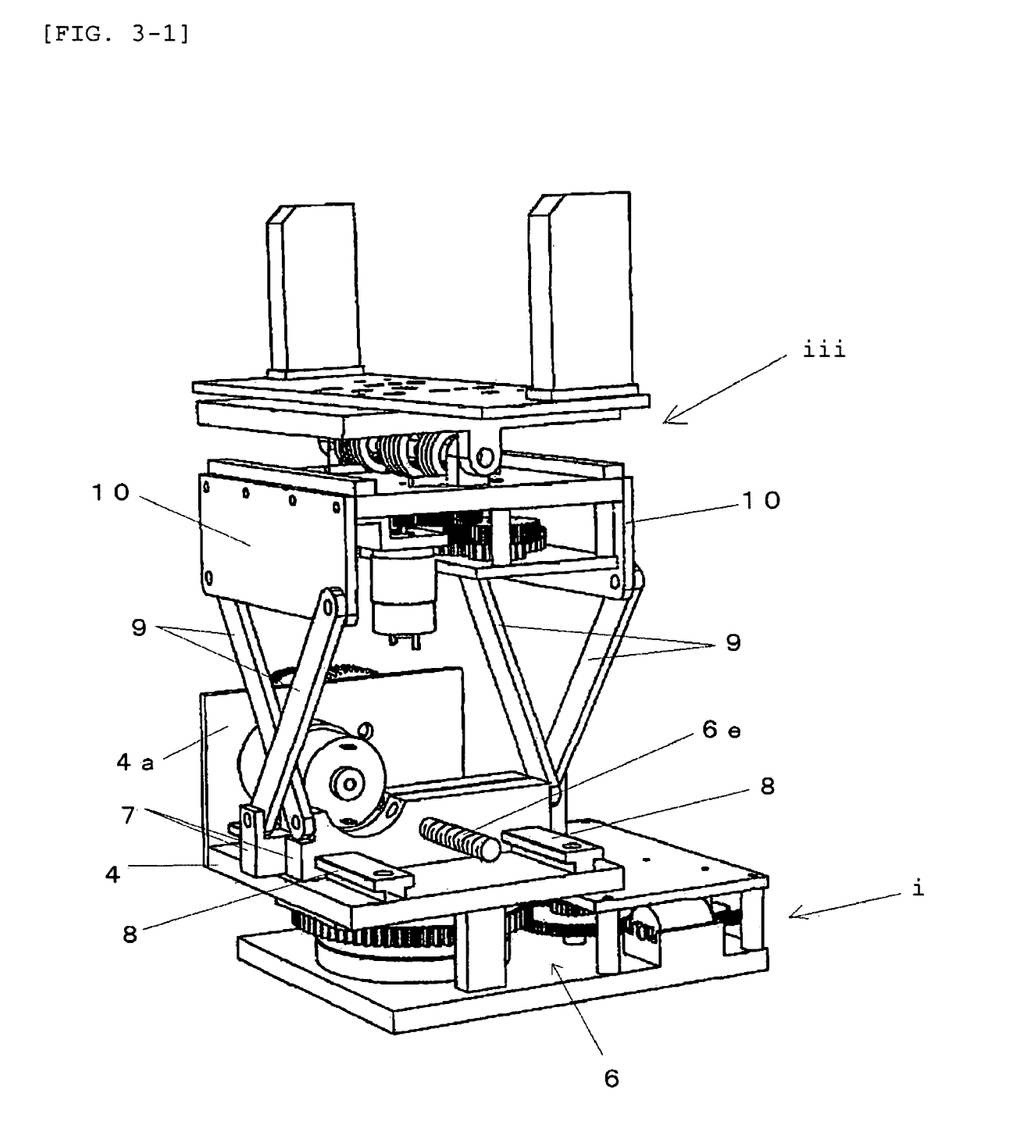

FIG. 3 shows a state where the flat display D is moved up from the state in FIG. 1 as indicated by an arrow and FIG. 3-1 especially shows an enlarged view of the elevation driving unit ii. To a side plate 4a which stands from the base plate for elevation 4 at right angle, the electric motor for elevation 5 and a train of gears for reducing speed 6 are provided.

Figure 32:
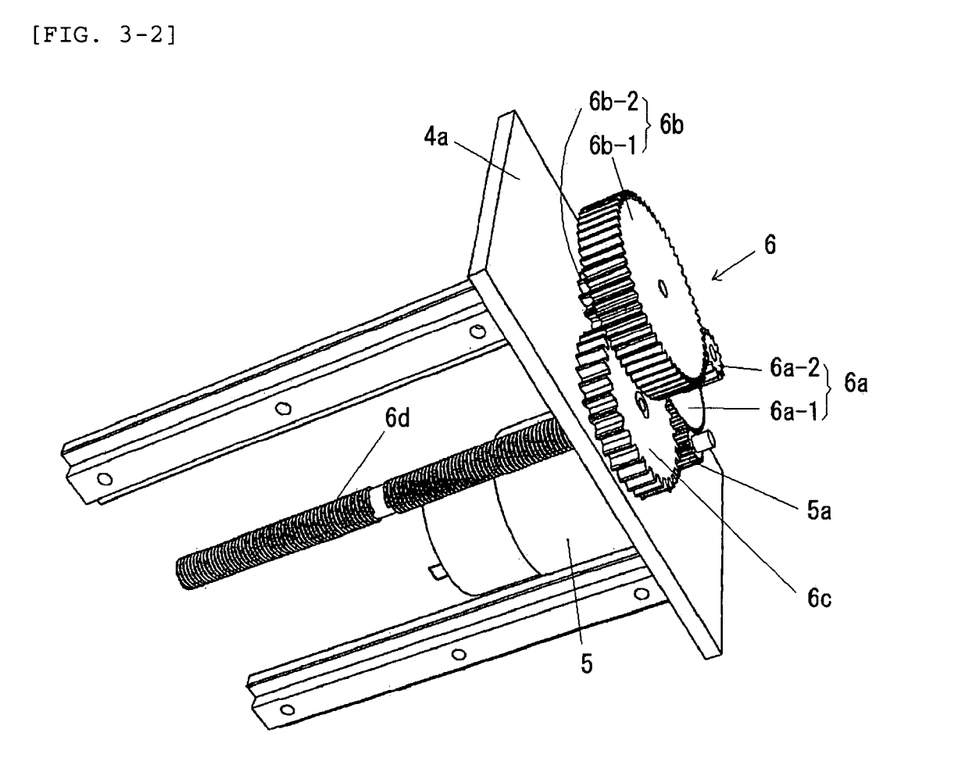

As shown in FIG. 3-2, a pinion gear 5a attached to the output rotation axis of the electric motor for elevation 5 is engaged with a large gear 6a-1 of a first gear 6a. A small gear 6a-2 of the first gear 6a is engaged with a large gear 6b-1 of a second gear 6b while a small gear 6b-2 thereof is engaged with a third gear 6c. Thus, due to the pinion gear 5a and the train of gears for reducing speed for elevation 6, rotation of the electric motor for elevation 5 is reduced to a large extent.

To the third gear 6c, an elevation screw output axis 6d is attached and fixed in an integrated manner. On the elevation screw output axis 6d, from the center portion thereof, threads are formed to left and right in the longitudinal direction which are opposite with each other. To the threads, as apparent from FIG. 3-1, slide frames 7 and 7 are screwed together respectively and along with the rotation of the elevation screw output axis 6d, the slide frames 7 and 7 come closer or farther. Numeral 8 is a guide rail for guiding the slide frame 7.

Numeral 9 is a pantograph type elevation member of which lower end is pivotally attached to the slide frame 7 while the upper end thereof is pivotally attached to an elevation side plate 10. Therefore, along with the movement of the slide frames 7 and 7, the elevation side plate 10 moves up and down, that is, is elevated, to move the flat display D up and down via the tilting drive unit iii.

Figure 4:
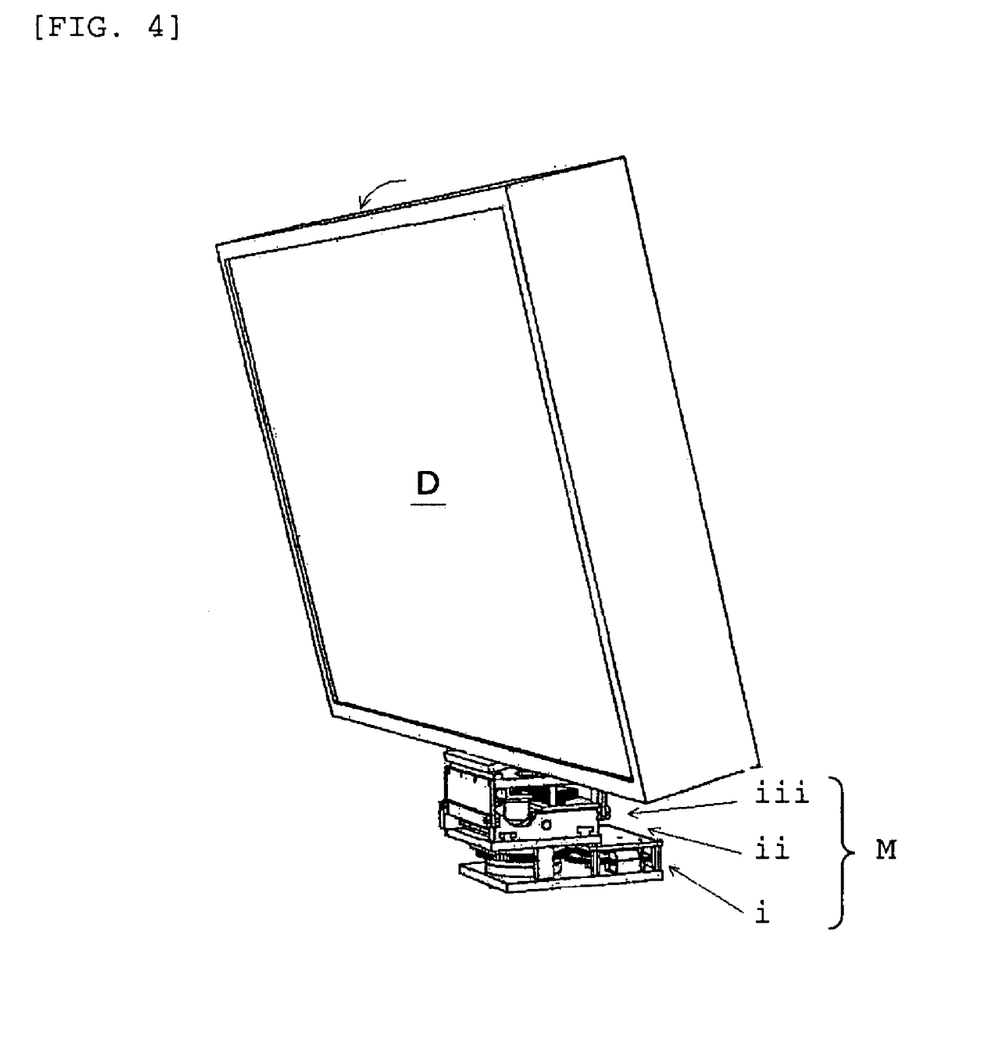
FIG. 4 is an explanatory diagram showing a condition where a flat display is tilted forward.
Figure 41:
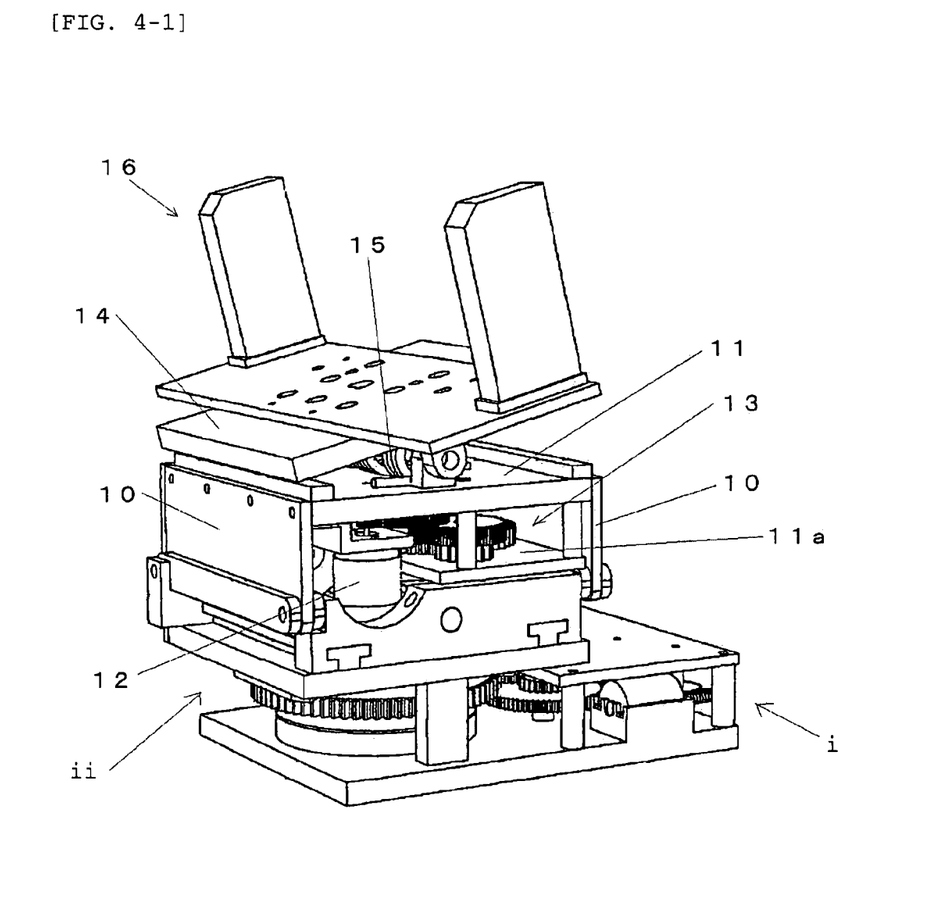

FIG. 4 shows a state where the flat display D is tilted forward from the state in FIG. 1. Especially, the tilting drive unit iii is enlarged in FIG. 4-1. In the figure, an electric motor for tilting 12 is attached to a base plate for tilting 11 which is mounted on the upper part of the elevation side plate 10.

Figure 42:
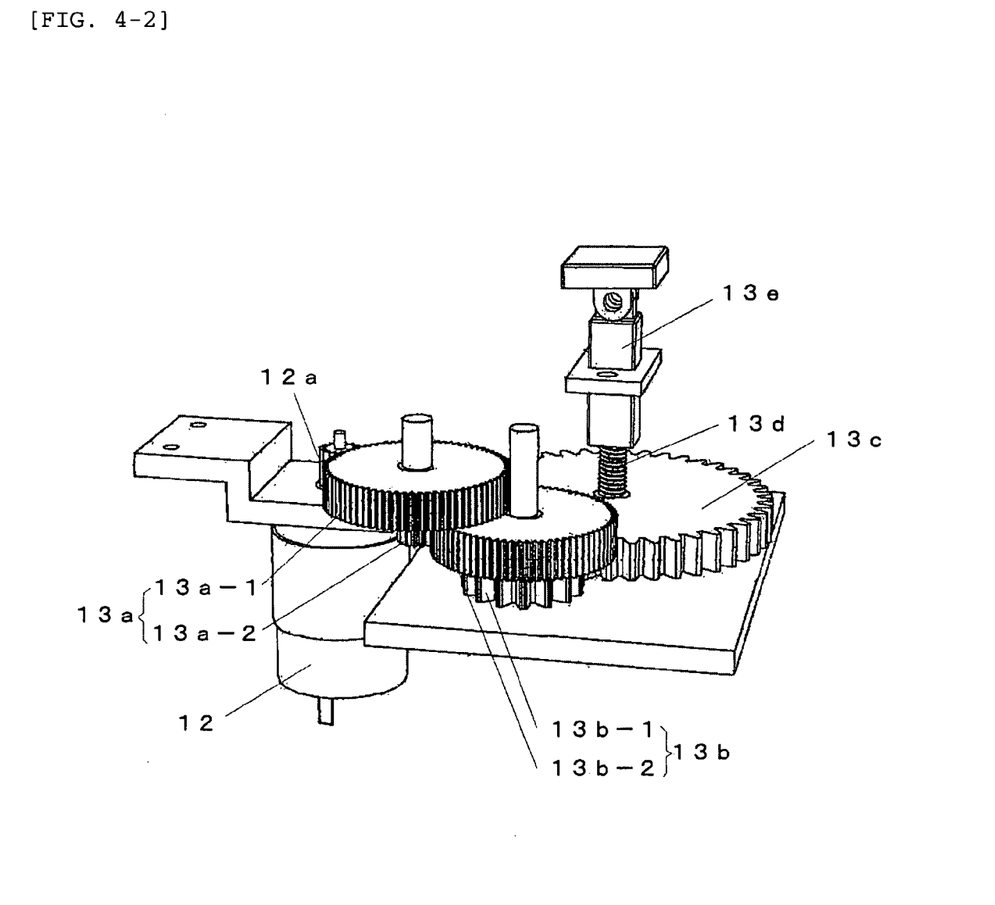

As shown in FIG. 4-2, a pinion gear 12a attached to the rotation output axis of the electric motor for tilting 12 is engaged with a large gear 13a-1 of a first gear 13a. A small gear 13a-2 of the first gear 13a is engaged with a large gear 13b-2 of a second gear 13b while a small gear 13b-1 thereof is engaged with a third gear 13c. Thus, due to the pinion gear 12a and a train of gears for reducing speed for tilting 13, rotation of the electric motor for tilting 12 is reduced to a large extent.

A screw output axis for tilting 13d is integrally attached and fixed to the third gear 13c. To the screw output axis for tilting 13d, a moving chip 13e is screwed together and moves up and down along with the rotation of the screw output axis 13d.

Figure 43:
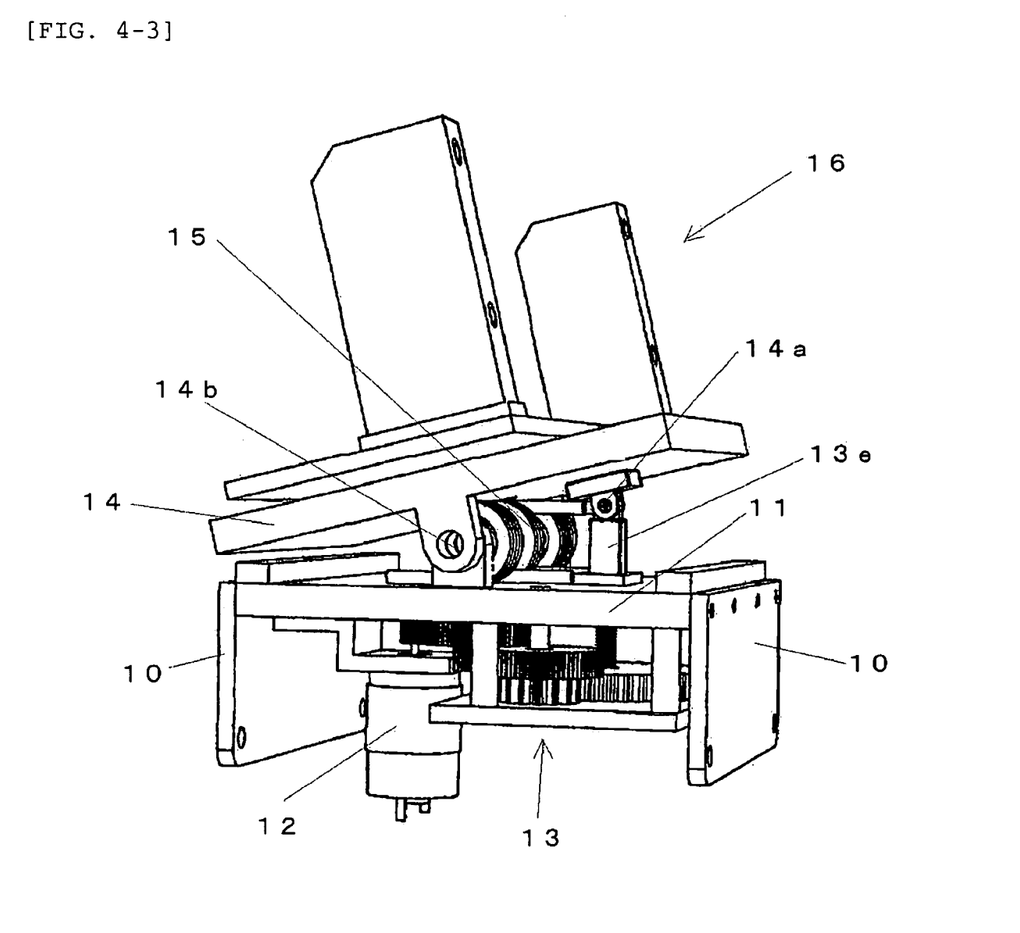

As apparent from FIG. 4-3, the moving chip 13e is connected to a tilting plate 14 via a pivotal attachment part 14a. The tilting plate 14 is pivotally attached to the base plate for tilting 11 via a pivotal attachment shaft 14b and the pivotal attachment part 14a is deviated toward the pivotal attachment shaft 14b. Therefore, the tilting plate 14 is tilted along with the up and down movement of the moving chip 13e, enabling the flat display D to tilt backward and forward via a display attachment member 16. Numeral 15 is a torsion spring which is provided for balancing the flat display D when it is moved backward and forward.

Figure 44:
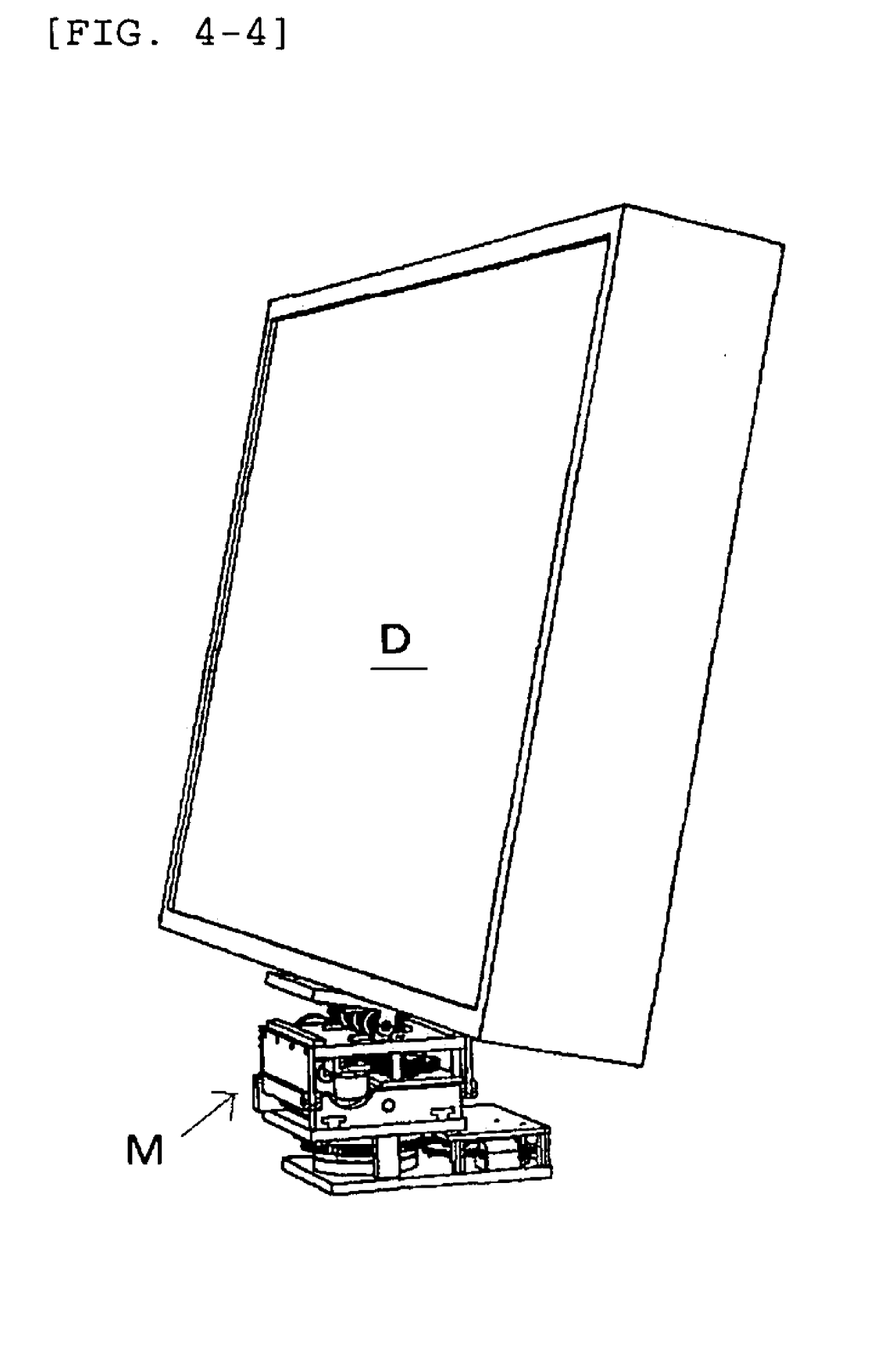

FIG. 4-4 is a view showing a state where the flat display D is tilted backward by rotating the electric motor for tilting 12 in reverse direction.

In the above embodiment, the elevating means for elevating the base plate for tilting includes screw output axis for elevation as an output axis of the train of gears for reducing speed, a slide frame which is screwed together with the screw output axis for elevation and slides, and a pantograph type elevation member which allows the base plate for tilting which is connected to the upper end of the slide frame to move up and down. However, the elevation means of the present invention is not limited thereto.

Moreover, in the above embodiment, tilting means for tilting the tilting plate includes a tilting screw output axis as an output axis of the train of gears for reducing speed for tilting and an elevating chip which is screwed together with the tilting screw output axis and moves up and down. However, the tilting means of the present invention is not limited thereto. Note that the electric motors 2, 5, and 12 of the present invention is remotely controlled by wired or wireless means.

LEGEND FOR REFERENCE NUMERALS 1 base plate for rotation
1a stopper
2 electric motor for rotation
2a warm gear
3 train of gears for reducing rotation speed
3a first gear
3a-1 large gear
3a-2 small gear
3b second gear
3b-1 large gear
3b-2 small gear
3c third gear
3c-1 large gear
3c-2 small gear
3d fourth gear
3d-1 large gear 3*d*-2 small gear
3*e* fifth gear
3*f* rotation output axis
4 base plate for elevation
4*a* side plate
5 electric motor for elevation
6 train of gears for reducing speed
6*a* first gear
6*a*-1 large gear
6*a*-2 small gear
6*b* second gear
6*b*-1 large gear
6*b*-2 small gear
6*c* third gear
6*d* elevation screw output axis
7 slide frame
8 guide rail
9 pantograph type elevation member
10 elevation side plate
10*a* bottom plate
11 base plate for tilting
12 electric motor for tilting
12*a* pinion gear
13 train of gears for reducing speed
13*a* first gear
13*a*-1 large gear
13*a*-2 small gear
13*b* second gear
13*b*-1 large gear
13*b*-2 small gear
13*c* third gear
13*d* screw output axis for tilting
13*e* moving chip
14 tilting plate
14*a* pivotal attachment part
14*b* pivotal attachment shaft
15 torsion spring
16 display attachment member
D flat display
M driving apparatus
i rotation driving unit
ii elevation driving unit
iii tilting driving unit

What is claimed is:

1. A flat display driving apparatus for supporting a flat display at a lower part of thereof, moving the flat display horizontally in a rotating manner, moving it up and down vertically, and tilting it backward and forward, comprising: a rotation driving unit, an elevation driving unit, and a tilting driving unit which are mounted from the bottom in series, wherein the rotation driving unit in the bottom includes an electric motor for rotation which is provided to a base plate for rotation and a train of gears for reducing rotation speed which reduces the rotation of the motor to rotate a base plate for up and down movement; the elevation driving unit in the middle includes an electric motor provided to the base plate for up and down movement and a train of gears which reduces the rotation of the motor as well as moves a base plate for tilting up and down via an elevating means, and the driving unit on the top includes an electric motor for tilting which is provided to the base plate for tilting and a train of gears for tilting and reducing rotation speed which reduces the rotation speed of the motor and tilts a tilting plate provided to the flat display via a tilting means.

2. The flat display driving apparatus according to claim 1, wherein the elevating means includes an elevating screw output axis which is an output axis of the train of gears for reducing rotation speed, a slide frame which screws together with the elevating screw output axis and slides to move, and a pantograph type elevating member of which upper end moves up and down along with the movement of the slide frame to move up and down the base plate for tilting which is connected to the upper end.

3. The flat display driving apparatus according to either claims 1, wherein the tilting means includes a screw output axis for tilting and an elevating chip which screws together with the screw output axis for tilting and moves up and down and tilts the base plate for tilting.

* * * * *